April 26, 1932.  H. J. CRINER ET AL  1,855,706
BREAD SLICING MACHINE
Filed April 20, 1931   3 Sheets-Sheet 1
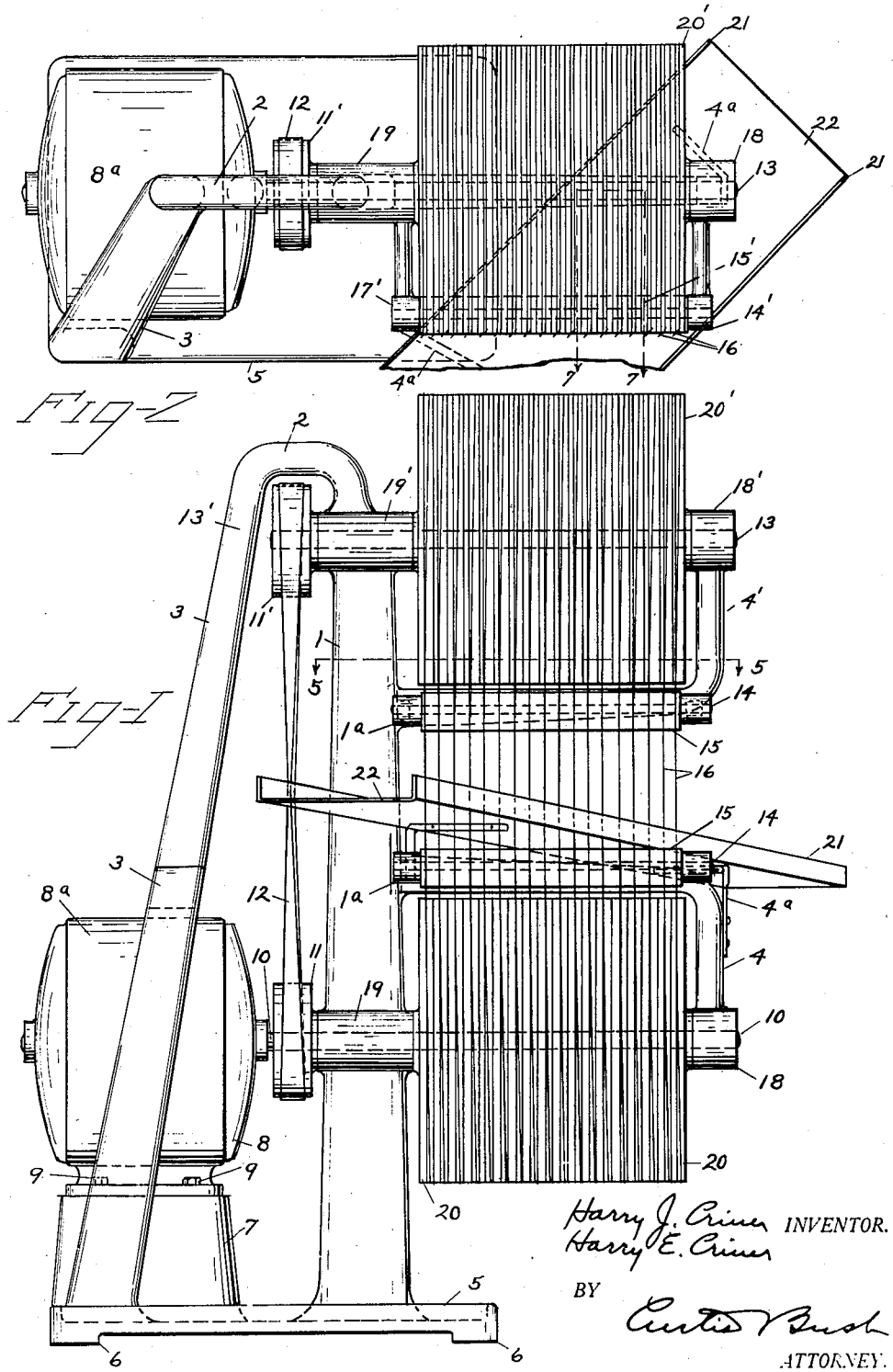

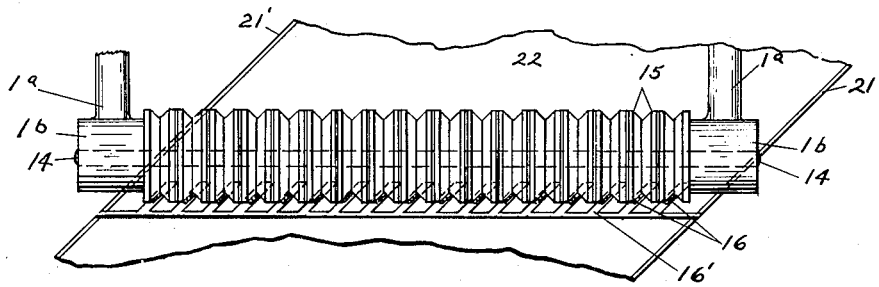
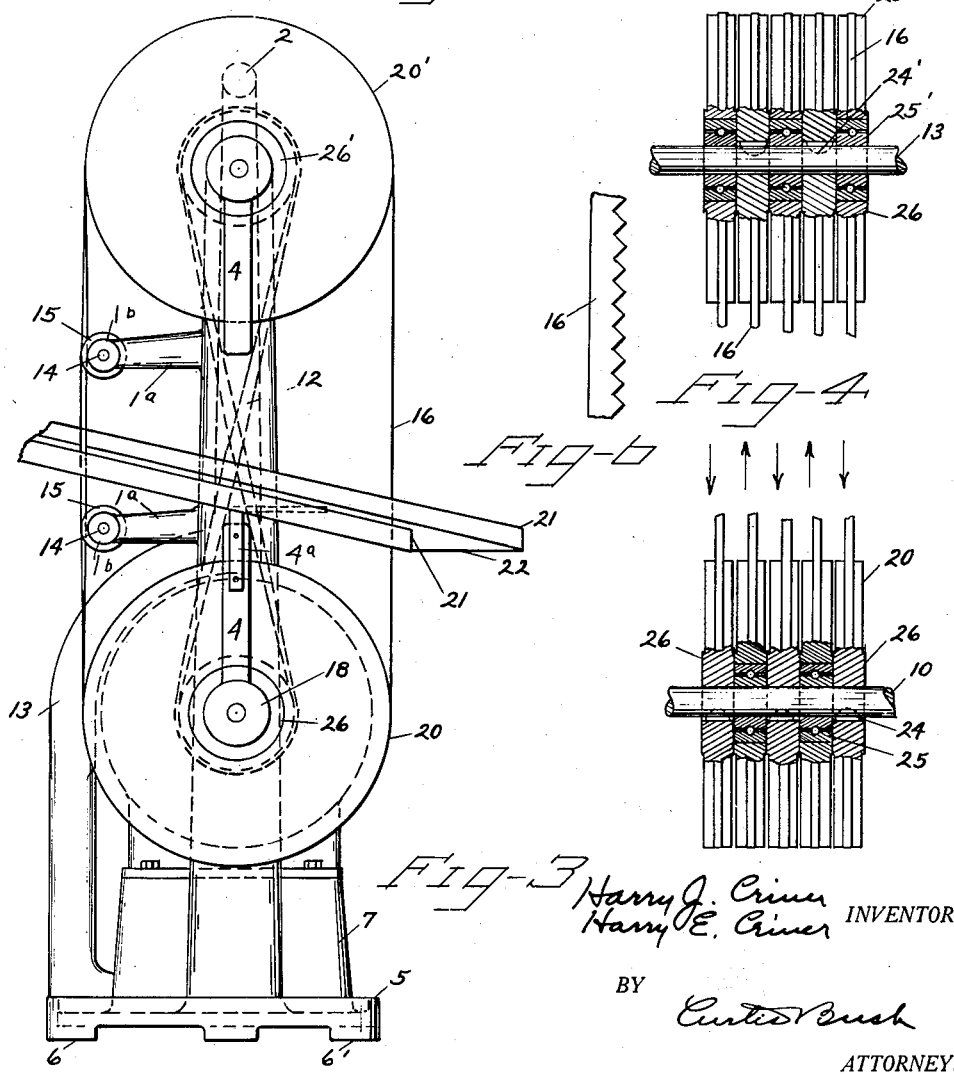

April 26, 1932.　　H. J. CRINER ET AL　　1,855,706
BREAD SLICING MACHINE
Filed April 20, 1931　　3 Sheets-Sheet 3
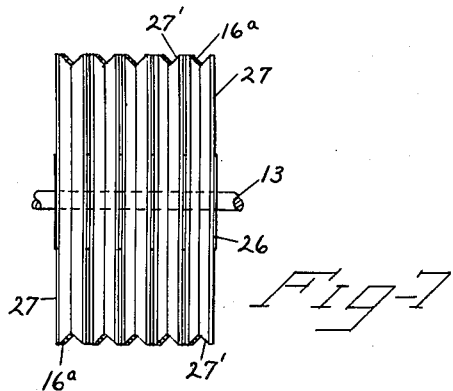
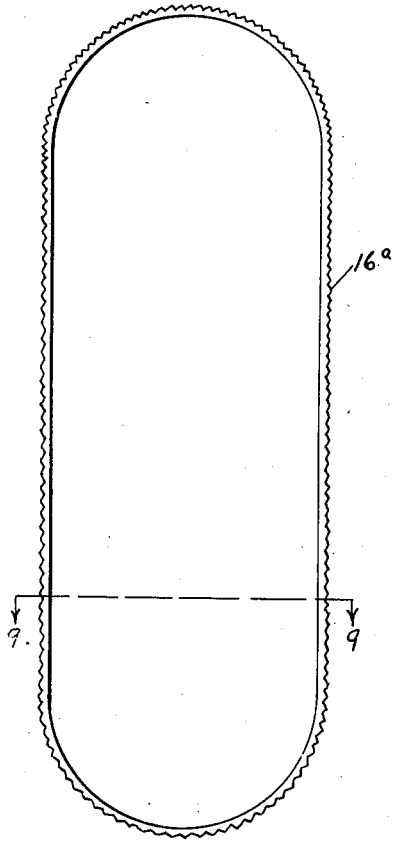
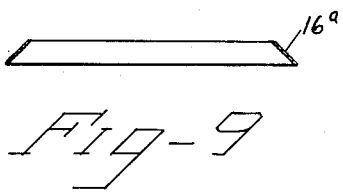
Harry J. Criner
Harry E. Criner INVENTOR.
BY
ATTORNEY.

Patented Apr. 26, 1932

1,855,706

UNITED STATES PATENT OFFICE

HARRY J. CRINER AND HARRY E. CRINER, OF DAVENPORT, IOWA, ASSIGNORS OF ONE-HALF TO A. G. BUSH, OF DAVENPORT, IOWA

BREAD SLICING MACHINE

Application filed April 20, 1931. Serial No. 531,426.

Our invention relates to improvements in bread slicing machines utilizing a band blade somewhat similar to a band saw, as the cutter.

The objects of our invention are:

1. To provide a band slicing machine in which two series of pulleys of uniform size may be utilized to drive alternate bands continuously; and to provide means by which all or limited portions of the blades may be operated at an angle to the plane of the entire series of blades so as to present the cutting edges of the blades in parallel spaced relation and to slice the bread at an angle to the plane of travel of the series.

2. To provide a band slicing machine in which two series of pulleys of uniform size may be utilized to drive the cutting bands continuously, alternate bands being driven in opposite directions;

3. To provide means which will allow the bread to be fed through a band slicing machine in which the bands operate simultaneously, without altering the direction of the bread in its passage through the machine.

We attain these objects by the means illustrated in the accompanying drawings, in which,—

Figure 1 is a front elevation of our machine;

Figure 2 is a plan view thereof;

Figure 3 is a side elevation thereof;

Figure 4 is an enlarged detail partly in section, showing the means by which alternating bands are driven in opposite directions;

Figure 5 is an enlarged detail plan view of one set of guides;

Figure 6 is an enlarged detail showing an alternate form of cutting blade;

Figure 7 is an enlarged detail of an alternate form of pulley;

Figure 8 is an enlarged detail of an alternate form of band-cutter:

Figure 9 is a sectional detail of the line 9—9 of Figure 8.

Similar numerals refer to similar parts throughout the several views.

Our apparatus comprises a base, 5, with feet, 6, formed integral therewith, with a vertical column, 1, united to the base and a diagonal brace, 3, united to the base and having its upper end, 2, connected with the upper end of the column.

The column has large hubs or bosses, 19 and 19', united thereto or formed integral therewith. A motor shaft, 10, is mounted in the lower hub, 19, and extends outwardly in both directions therefrom. Upon one end of the motor shaft, 10, a motor, 8, is attached, and the motor housing, 8a, is attached to a pedestal, 7, united to the base, 5. The motor housing 8a, may be secured to the pedestal by bolts, 9, or other suitable means.

An arm, 4, is united to the column, 1, and extends outwardly therefrom opposite the motor. The lower end of the arm, 4, has a hub, 18, formed integral therewith, which forms a bearing for the outer end of the shaft, 10.

A similar arm, 4', is united to the column near the upper end thereof, having a hub, 18', formed integral therewith, which forms a support for the outer end of the shaft, 13, which shaft is revolvably mounted in the hub, 19', and the inner end of which carries a belt pulley, 11'. A corresponding pulley, 11, is mounted upon the motor shaft, 10, between the column and the motor and a belt, 12, runs upon the pulleys, 11 and 11', and may be twisted as shown in Figures 1 and 3 so as to drive the shafts, 10 and 13, in opposite directions.

Upon the shafts, 10 and 13, we mount a plurality of pulleys, 20 and 20', each pulley, 20, being in vertical alinement with its corresponding pulley, 20', and the shafts, 10 and 13, are parallel and in vertical alinement.

All the pulleys, 20 and 20', are preferably formed of the same diameter and with corresponding peripheries. The peripheries of the pulleys may be flat as shown in Figure 7.

In the upper series of pulleys, 20', one-half of the pulleys are revolvably mounted upon the shaft, 13, preferably upon ball bearings, 25', and the remaining pulleys are rigidly secured to the shaft by keys, 24', or other suitable means. The pulleys are provided with hubs, 26, which are slightly thicker than the remainder of the pulleys, the hubs acting as spacers and the remainder of the pulleys being slightly separated as shown in the enlarged detail Figure 4.

The pulleys, 20, upon the lower shaft, 10, are similarly arranged, but the keyed pulleys upon the lower shaft are in alinement with the idler pulleys upon the upper shaft and the idler pulleys upon the lower shaft are in alinement with the keyed pulleys upon the upper shaft. As a consequence, the keyed pulleys upon each shaft necessarily turn with that shaft while the idler pulleys are free to revolve either in a different direction or in the same direction at a different speed.

It is obvious that when the belt is twisted as shown in Figure 3, and the lower shaft, 10, is driven by the motor, the upper shaft, 13, will be driven at the same speed but in the opposite direction; thus one set of cutting blades, 16, will be driven in one direction and the alternate set in the opposite direction.

The cutting blades, 16, are made of narrow strips of steel similar to band saws, but thinner, and have the cutting edges sharpened to a knife-edge or they may be serrated as shown in Figure 6. We prefer to use the serrated form as that form of blade will cut a little more rapidly than the straight or sinuous knife-edged blade.

The blades, 16, are mounted upon and driven by the pulleys, 20 and 20'. When the flat type of blade, 16, shown in Figure 4, is used, it is obvious that the cutting portions of the blades would all lie in the same plane and would make but a single cut. In order to cause each blade, 16, to cut a separate path through the bread, it is necessary to use means which will turn the particular portion of the blade traveling through the bread at any given time, at an angle to the remainder of the blade, as shown clearly in Figure 3. To accomplish this, we provide arms 1a, which are formed integral with the column, 1, and extend horizontally at right angles therefrom and are arranged in upper and lower pairs. Upon the outer ends of the arms, 1a, we form hubs, 1b, and in each pair of hubs, 1b, we mount a shaft, 14.

Upon each shaft, 14, we revolvably mount a plurality of pulleys, 15, each of which has a V-shaped groove formed in the periphery thereof. The upper and lower series of pulleys, 15, are preferably spaced far enough apart to permit a loaf of bread lying on one side or on its bottom, to readily pass between them and the closer these sets of pulleys can be kept together, the more steady and even will be the slicing of the bread, but if it is desired to use both sides of the machine at once, the pulleys may be spaced farther apart so as to permit the introduction of two feeding tables at right angles to each other, in which case an additional pair of arms with additional shafts and pulleys, 14 and 15, would be provided to bear against the blades on the side of the machine opposite to the first mentioned pair.

The upper series of pulleys, 15, is preferably located a short distance lower than the bottom of the pulleys, 20', and as the blades pass from the pulleys, 20', to and over the pulleys, 15, it is obvious that the blades will be twisted so that while they lie parallel to the periphery of the pulleys, 20', at the top thereof, they are turned approximately one-eighth of a turn and pass over the pulleys, 15, at an angle of approximately 45° to a vertical plane parallel with the adjacent side of the pulleys, 20'. The blades remain at this angle of 45° until they pass over the lower set of pulleys, 15, after passing which they twist back to their original position parallel with the face of the pulleys, 20.

We have described the action of the blades passing downward over the pulleys, 15, and of course a similar action takes place with the alternate blades which pass upwardly over the pulleys, 15.

It will not be necessary in all cases to turn the blades to an angle of 45°, as the spacing of the blades and the size of the pulleys may be varied to permit a lesser angle, it being obvious that the farther apart the cutting blades are located from each other, the less the angle to which it would be necessary to twist them.

Between the sets of pulleys, 20 and 20', we secure by any suitable means such as brackets, 4a, a feed table, 22, with side flanges, 21, acting as guides for the bread. The feed table, 22, preferably slopes downward from the feed to the discharge end thereof and may be closely connected with a wrapping machine or other handling apparatus.

The feed table, 22, is provided with slots, 16', through which the blades, 16, pass and the table, 22, may be formed in two pieces as shown in Figure 5, to facilitate mounting it with the blades passing through the slots.

The table, 22, is preferably set at an angle of approximately 45° to the pulley shaft, 10, the angle of the table being varied to correspond with the angle of the cutting blades at the point where they pass through and slice the loaves of bread, it being obvious that the table would necessarily extend in lines parallel to the sides of the blades as they cut through the bread. When arranged in this way, the bread as fed into the machine would reach the left cutting blade, 16, as shown in Figure 2, first and the left blade would be entirely through cutting the loaf before the right blade of the series had begun to cut. In this way, it is easy to avoid impaction of the bread which occurs where a large number of blades are passing through a given loaf simultaneously in alinement. The staggered, or rather progressive, position of our blades will avoid any substantial impaction.

The thin band blades utilized for slicing in this machine will stand twisting at an angle of thirty to forty-five degrees without any substantial danger of breakage. However, in order to avoid even this slight twisting effect, the blades may be made in the alternate form shown in Figures 7, 8 and 9. Figure 7 shows an alternative form of drive and idler pulleys, 27, with hub, 26, with V-shaped groove, 27′, extending all around its periphery, with cutting blades, 16a, shown in section.

In Figure 8, we have shown a side elevation of the alternate form of band-blade, 16a, in the position it would occupy when running over the pulleys, but for clearness, we have omitted the pulleys or any of their parts. Figure 9 is a cross-section of the band-blade on the line, 9—9, of Figure 8.

While we have shown the blades, 16a, flaring outwardly at an angle of approximately 45°, it is obvious that this angle may be varied as heretofore pointed out, without departing from the spirit of our invention or the usefulness of the machine.

In the operation of our machine, the motor is started up and the belt, 12, drives the pulleys, 11 and 11′, in opposite directions. The bread is placed upon the feed table at the left of Figures 1 or 3, and is fed downwardly along the table, 22, until the left end of the loaf reaches the first or left cutting blade, which then begins to cut and as the bread progresses, the succeeding blades begin to cut successively until the entire loaf has been sliced.

Each loaf may be pushed through the cutting blades by the following loaf, so that the bread may be fed in a constant stream without any loss of time. As one-half of the blades, or possibly one more than half of them, will be traveling downwardly in cutting the bread, it is obvious that the friction of the blades passing downwardly will equal any friction of the blades which pass upwardly through the bread and avoid any vertical displacement of the loaf and also avoid a tendency of the loaf to cant or tip cornerwise. As there are no reciprocating parts upon this machine, but the entire action of the working parts is either a continuous rotary or continuous band movement, it is obvious that there is very little tendency to vibration if the parts are properly balanced and the machine may consequently be driven at a very high rate of speed which will permit very rapid cutting of the bread.

It is obvious that various modifications of the frame and other parts of this machine, or a substitution of various equivalents, may be made without departing from the spirit of our invention and we do not limit our claims to the precise form of apparatus shown in the drawings.

When the length of the series of drive pulleys and the diameter of those pulleys are the same, it is obvious that the feed table cannot lie at a greater angle than 45° to the drive shafts, but where the diameter of the pulleys is substantially greater than the length of the series of pulleys, the bread chute or table, 22, may lie at an even greater angle than 45° to the drive shafts and it may lie at a much less angle than 45°, and the angle of the actively cutting portion of the blades may be varied to correspond to the angle of the feed table. The number of drive and idler pulleys may be varied to correspond to the length of the loaves of the bread intended to be sliced and the desired thickness of the slices. The width of the feed table should, of course, equal the length of the loaves intended to travel thereon and the loaves travel at right angles to the table.

Very thin slices may be provided for by turning the actively cutting portions of the blades at a relatively slight angle to the shafts, 10 and 13, and arranging the feed table and slots therein to correspond.

We claim:

1. A bread slicing machine comprising a frame, parallel upper and lower shafts revolvably mounted in the frame, a series of pulleys mounted upon the upper shaft comprising a plurality of driven pulleys keyed to the shaft combined with a plurality of idler pulleys revolvably mounted upon the shaft, said driven pulleys an idler pulleys being arranged in alternation thereon, a corresponding series of pulleys similarly mounted upon the lower shaft, each driven pulley upon the upper shaft being mounted in the same vertical plane as one of the idler pulleys upon the lower shaft—the two constituting a pair —each idler pulley upon the upper shaft being mounted in the same vertical plane as one of the driven pulleys upon the lower shaft and the two constituting a pair, an endless slicing band mounted upon each pair of pulleys and means for driving the shafts.

2. A bread slicing machine comprising a frame, parallel upper and lower shafts revolvably mounted in the frame, a series of pulleys mounted upon the upper shaft comprising a plurality of driven pulleys keyed to the shaft combined with a plurality of idler pulleys revolvably mounted upon the shaft, said driven pulleys and idler pulleys being arranged in alternation thereon, a corresponding series of pulleys similarly mounted upon the lower shaft, each driven pulley upon the upper shaft being mounted in the same vertical plane as one of the idler pulleys upon the lower shaft—the two constituting a pair—each idler pulley upon the upper shaft being mounted in the same vertical plane as one of the driven pulleys upon the lower shaft and the two constituting a pair, and each pulley having a continuous V-shaped groove formed in its periphery, an endless slicing ban mounted upon each pair of pulleys, and means for driving the shafts.

3. A bread slicing machine comprising a frame, parallel upper and lower shafts revolvably mounted in the frame, a series of pulleys mounted upon the upper shaft comprising a plurality of driven pulleys keyed to the shaft combined with a plurality of idler pulleys revolvably mounted upon the shaft, said driven pulleys and idler pulleys being arranged in alternation thereon, a corresponding series of pulleys similarly mounted upon the lower shaft, each driven pulley upon the upper shaft being mounted in the same vertical plane as one of the idler pulleys upon the lower shaft—the two constituting a pair—each idler pulley upon the upper shaft being mounted in the same vertical plane as one of the driven pulleys upon the lower shaft and the two constituting a pair, an endless slicing band mounted upon each pair of pulleys, means for twisting a portion of the blades intermediate the pulleys to an angle of approximately 45° to the main portion thereof, and means for driving the shafts.

4. A bread slicing machine comprising a frame, parallel upper and lower shafts revolvably mounted in the frame, a series of pulleys mounted upon the upper shaft comprising a plurality of driven pulleys keyed to the shaft combined with a plurality of idler pulleys revolvably mounted upon the shaft, said driven pulleys and idler pulleys being arranged in alternation thereon, a corresponding series of pulleys similarly mounted upon the lower shaft, each driven pulley upon the upper shaft being mounted in the same vertical plane as one of the idler pulleys upon the lower shaft—the two constituting a pair—each idler pulley upon the upper shaft being mounted in the same vertical plane as one of the driven pulleys upon the lower shaft and the two constituting a pair, an endless slicing band mounted upon each pair of pulleys, means for twisting a portion of the blades intermediate the pulleys to an angle of from 30° to 45° to the main portion thereof, and means for driving the shafts.

5. A bread slicing machine comprising a frame, parallel upper and lower shafts revolvably mounted in the frame, a series of pulleys mounted upon the upper shaft comprising a plurality of driven pulleys keyed to the shaft combined with a plurality of idler pulleys revolvably mounted upon the shaft, said driven pulleys and idler pulleys being arranged in alternation thereon, a corresponding series of pulleys similarly mounted upon the lower shaft, each driven pulley upon the upper shaft being mounted in the same vertical plane as one of the idler pulleys upon the lower shaft—the two constituting a pair—each idler pulley upon the upper shaft being mounted in the same vertical plane as one of the driven pulleys upon the lower shaft and the two constituting a pair, an endless slicing band mounted upon each pair of pulleys and running over said pulleys parallel to the periphery thereof, upper and lower pairs of supporting arms united to the frame, an idler shaft revolubly mounted in each pair of arms, a plurality of pulleys having bevelled peripheries mounted upon each idler shaft, said pulleys being arranged to bear against the blades between the drive pulleys and to twist a portion between the drive pulleys at an angle to the faces of the drive pulleys and means for driving the bands.

6. A bread slicing machine comprising a frame, parallel upper and lower shafts revolvably mounted in the frame, a series of pulleys mounted upon the upper shaft comprising a plurality of driven pulleys keyed to the shaft combined with a plurality of idler pulleys revolvably mounted upon the shaft, said driven pulleys and idler pulleys being arranged in alternation thereon, a corresponding series of pulleys similarly mounted upon the lower shaft, each driven pulley upon the upper shaft being mounted in the same vertical plane as one of the idler pulleys upon the lower shaft—the two constituting a pair—each idler pulley upon the upper shaft being mounted in the same vertical plane as one of the driven pulleys upon the lower shaft and the two constituting a pair, an endless slicing band mounted upon each pair of pulleys and running over said pulleys parallel to the periphery thereof, upper and lower pairs of supporting arms united to the frame, an idler shaft revolubly mounted in each pair of arms, a plurality of pulleys having bevelled peripheries mounted upon each idler shaft, said pulleys being adapted to bear against the blades between the drive pulleys and to twist a portion between the drive pulleys at an angle of from 30° to 45° to the faces of the drive pulleys and means for driving the bands.

7. A bread slicing machine comprising a frame, parallel upper and lower shafts revolvably mounted in the frame, a series of pulleys mounted upon the upper shaft comprising a plurality of driven pulleys keyed to the shaft combined with a plurality of idler pulleys revolvably mounted upon the shaft, said driven pulleys and idler pulleys being arranged in alternation thereon, a corresponding series of pulleys similarly mounted upon the lower shaft, each driven pulley upon the upper shaft being mounted in the same vertical plane as one of the idler pulleys upon the lower shaft—the two constituting a pair—each idler pulley upon the upper shaft being mounted in the same vertical plane as one of the driven pulleys upon the lower shaft and the two constituting a pair, an endless slicing band mounted upon each pair of pulleys and running over said pulleys parallel to the periphery thereof, upper and lower pairs of supporting arms united to the frame, an idler shaft revolubly mounted in each pair of arms, a plurality of pulleys having bevelled peripheries mounted upon each shaft, said pulleys being adapted to bear against the blades between the drive pulleys and to twist a portion between the drive pulleys at an angle of approximately 45° to the faces of the drive pulleys and means for driving the bands.

In testimony whereof they affix their signatures.

HARRY J. CRINER.
HARRY E. CRINER.